(12) United States Patent
Pickel

(10) Patent No.: US 7,987,697 B2
(45) Date of Patent: Aug. 2, 2011

(54) CURING BLADDER LEAK DETECTION SYSTEM FOR A TIRE PRESS

(75) Inventor: David Michael Pickel, Mt. Vernon, IL (US)

(73) Assignee: Continental Tire North America, Inc., Charlotte, NC (US)

( * ) Notice: Subject to any disclaimer, the term of this patent is extended or adjusted under 35 U.S.C. 154(b) by 467 days.

(21) Appl. No.: 12/216,949

(22) Filed: Jul. 14, 2008

(65) Prior Publication Data

US 2010/0005863 A1 Jan. 14, 2010

(51) Int. Cl.
*G01M 3/04* (2006.01)
(52) U.S. Cl. ............................ 73/40; 73/40.7
(58) Field of Classification Search ............... 73/40, 40.7
See application file for complete search history.

(56) References Cited

U.S. PATENT DOCUMENTS

| 5,172,583 | A | * | 12/1992 | Tallon ......................... 73/40.7 |
| 5,417,900 | A | * | 5/1995 | Martin, Sr. .................. 264/40.5 |
| 6,330,821 | B1 | * | 12/2001 | Arnold et al. .................... 73/40 |
| 6,401,524 | B1 | * | 6/2002 | Incavo et al. .................... 73/40 |

* cited by examiner

*Primary Examiner* — Hezron Williams
*Assistant Examiner* — Rodney T Frank
(74) *Attorney, Agent, or Firm* — Greenblum & Bernstein, P.L.C.

(57) ABSTRACT

A method of detecting a leak in a curing bladder during a tire curing process provides a curing bladder (40) and tire (42) in a tire mold structure (18). An inert tracer gas (48) is added to a pressurized gas such as nitrogen, with the nitrogen inflating the curing bladder so that the curing bladder engages a portion of the tire. The method detects whether the inert gas is present between the curing bladder and the tire while the curing bladder and tire remain in the tire mold structure. A curing bladder leak detection system (10) for a tire curing press (12) is also provided.

19 Claims, 1 Drawing Sheet

CURING BLADDER LEAK DETECTION SYSTEM FOR A TIRE PRESS

FIELD OF THE INVENTION

The invention relates to tire making equipment and, more particularly, to the detection of a leak in the curing bladder of a tire curing press.

BACKGROUND OF THE INVENTION

In manufacturing pneumatic tires, the green tire is placed in a curing press wherein an inflatable curing bladder, supplied with steam, followed by nitrogen, which expands and presses the tire against a mold. The product is heated and then cures. The bladder is then deflated and then mold is opened to remove the cured product or tire. The process is repeated to manufacture multiple tires.

During curing, it is important that the desired curing pressure and temperature be maintained to cure the tire. If the bladder develops an undetected leak, this curing pressure and temperature can be reduced causing a defectively cured tire. If the leaking bladder remains undetected after multiple defective tires are cured, a significant number of scrap tires can be generated with one defective bladder since tires are visually inspected only after the curing process.

Attempts have been made to detect leaks in a tire curing process. For example, U.S. Pat. No. 5,417,900 discloses pulling a vacuum on the bladder and curing media piping. If a certain level of vacuum is not achieved within a time limit, the operator is notified that a leak exists in the system. However, bladders may develop very small pin holes that may not be detected by this system. Furthermore, the bladder may fold over on itself blocking the holes, which would not be detected by this system.

Thus, there is a need provide an improved leak detection system for detecting leaks in a curing bladder and thereby reduce the manufacture of scrap tires.

SUMMARY OF THE INVENTION

An object of the invention is to fulfill the need referred to above. In accordance with the principles of a disclosed embodiment, this objective is obtained by providing a method of detecting a leak in a curing bladder during a tire curing process. The method provides a curing bladder and tire in a tire mold structure. An inert tracer gas such as helium is added to the pressurized gas such as nitrogen, with the pressurized gas inflating the curing bladder so that the curing bladder engages a portion of the tire. The method detects whether the inert tracer gas is present between the curing bladder and the tire, immediately after internal pressure release, while the curing bladder and tire remain in the tire mold structure.

In accordance with another aspect of a disclosed embodiment, a curing bladder leak detection system for a tire curing press is provided. The tire curing press includes at least one tire mold structure with a curing bladder engaging a tire in the tire mold structure. The tire mold structure includes passage structure therein. The system includes a vacuum source constructed and arranged to evacuate, through the passage structure, a space between the curing bladder and the tire. A source of inert tracer gas is added to pressurized gas such as nitrogen for inflating the curing bladder. An electronic sensor is constructed and arranged to sense a presence of the inert tracer gas evacuated from the space.

In accordance with yet another aspect of the disclosed embodiment, a curing bladder leak detection system for a tire curing press is provided. The tire curing press includes at least one tire mold structure, a curing bladder engaging a tire in the tire mold structure. The tire mold structure includes passage structure therein. The system includes means for evacuating, through the passage structure, a space between the curing bladder and the tire. A source of inert tracer gas is added to pressurized gas such as nitrogen for inflating the curing bladder. The system includes means for sensing a presence of the inert tracer gas evacuated from the space.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
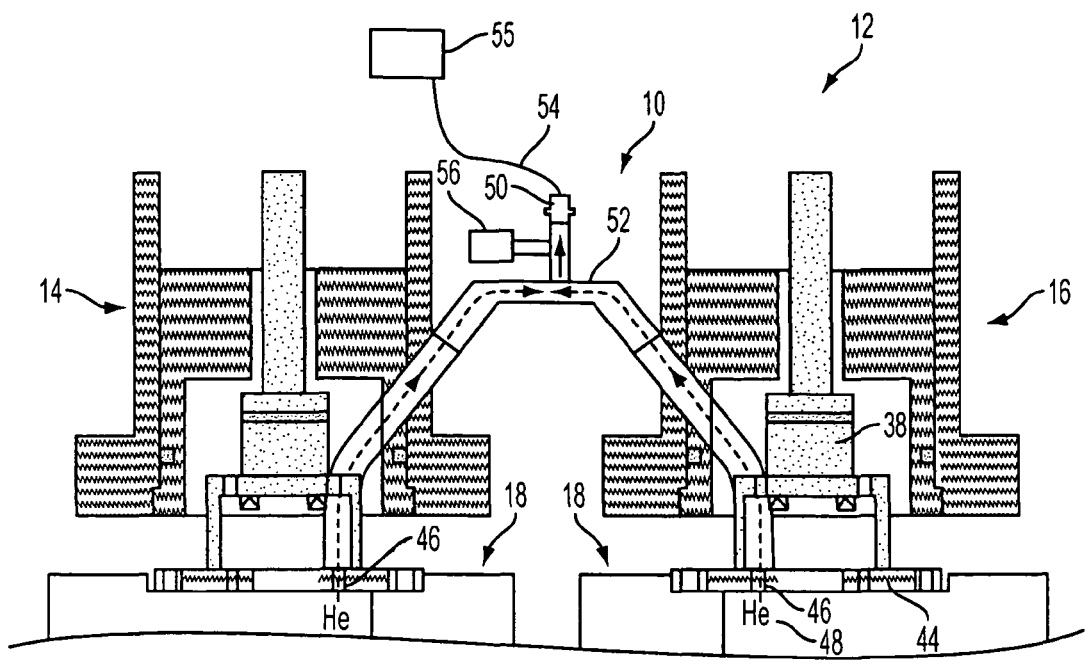
FIG. 1 is a schematic view of a curing bladder leak detection system of a tire curing press, provided in accordance with an embodiment of the invention.

With reference to FIG. 1, a curing bladder leak detection system is shown, generally indicated at 10, of a tire curing press, generally indicated at 12. The tire curing press 12 is a preferably a dual cavity press including a left cavity structure, generally indicated at 14, and a right cavity structure, generally indicated at 16. The cavities 14 and 16 are substantially identical and each includes a tire mold structure, generally indicated at 18.

Figure 2:
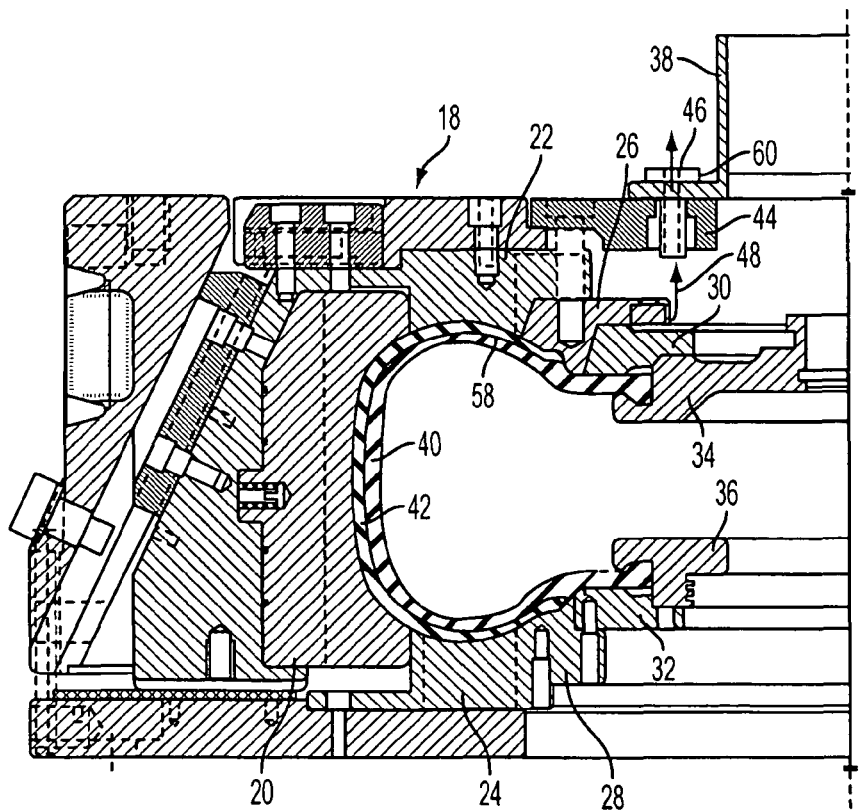
FIG. 2 is a sectional view of half of a tire mold structure of the tire curing press of FIG. 1, showing a flow path of inert gas between the tire and curing bladder.

With reference to FIG. 2, one half of a conventional tire mold structure 18 is shown in section. The structure 18 includes a mold tread segment 20, a mold sidewall plate top 22 and plate bottom 24, a mold bead ring top 26 and bead ring bottom 28, a bladder fix ring top 30 and fix ring bottom 32, a bladder clamping ring top and clamping ring bottom 36. The conventional curing bladder 40 is inflated by a pressurized fluid such as steam, causing the bladder 40 to push the tire 42 against the mold features and the tire is at least partially cured. The steam is typically replaced with nitrogen gas to complete curing of the tire 42.

A portion of a segmented mold operator is shown at 38. In the embodiment, the segmented mold operator 38 is secured to a top mold platen 44 of the structure 18. In accordance with the embodiment of FIG. 1, passage structure 46 is provided in the top mold platen 44, the function of which will be explained below.

An inert tracer gas, such as helium 48 is added to the pressured nitrogen noted above. The curing bladder leak detection system 10 includes an electronic sensor 50 in communication with piping 52 to sense the inert tracer gas 48 that may be in the piping 52. As shown, a single sensor 50 is arranged to sense leaking helium 48 from both cavities 14 and 16 due to the common piping 52 between the cavities 14, 16. The passage structure 46 of each cavity 14, 16 is in communication with the piping 52. The sensor 50 is electrically coupled via harness 54 with a controller such as a PLC 55. The sensor 50 can be a gas sensor, a temperature sensor, a pressure sensor, or any other sensor that would indicate the presence of the inert gas 48.

The system 10 also includes a vacuum source 56 that evacuates any inert gas 48 from any space 58 (FIG. 2) between the bladder 40 and tire 42 while the tire 42 and bladder 40 are still in the mold structure 18 and immediately after internal pressure release Thus, when the inert gas 48 is added to the pressurized fluid, if there is a leak in the bladder 40, the inert gas 48 will be drawn from the space 58, through the passage structure 46 and be detected by the sensor 50. Since the sensor 50 is coupled with the PLC 55, the PLC 55 will trigger a stop of the curing process in the associated cavity 14 or 16, when the inert gas 48 is detected by the sensor 50 so that no more tires are loaded and vulcanized using the defective bladder 40. A new bladder 40 can then be installed. Since the bladder 40 is checked for leaks, extended bladder use cycles are possible.

The passage structure 46 can be any passage that permits the inert gas 48 to exit the tire mold structure 18. In the embodiment of FIG. 2, the passage structure 46 is defined by a hollow bolt 60 that is used to couple the segmented mold operator 38 to the top mold platen 44. It can be appreciated that proper sealing is provided so as to prevent dilution by surrounding air of the inert gas 48 sensed.

Thus it can be seen that the bladder curing bladder leak detection system 10 reduces tire scrap since no tires will be loaded into a mold structure 18 having a leaking bladder 40. Leaks that are detected by the system 10 typically occur at about 400 psi. Such leaks may not be detected by conventional bladder leak detection systems such as those that merely measure a vacuum pulled on the bladder.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of detecting a leak in a curing bladder during a tire curing process, the comprising the steps of:
   providing a curing bladder and tire in a tire mold structure,
   adding an inert tracer gas to a pressurized gas, with the pressurized gas inflating the curing bladder so that the curing bladder is engaged with a portion of the tire, and
   detecting whether the inert tracer gas is present between the curing bladder and the tire while the curing bladder and tire remain in the tire mold structure,
   wherein the detecting step includes evacuating a space between the curing bladder and tire thereby drawing the inert tracer gas present between the curing bladder and tire out of passage structure in the tire mold structure.

2. The method of claim 1, wherein the detecting step includes sensing the presence of inert tracer gas using an electronic sensor.

3. The method of claim 2, wherein if inert tracer gas is detected by the sensor, the method further includes stopping the tire curing process and replacing the bladder.

4. The method of claim 3, wherein the sensor is electrically coupled to a controller, the controller causing stopping of the tire curing process.

5. The method of claim 1, wherein the passage structure is defined by a hollow bolt used in the tire mold structure.

6. The method of claim 1, wherein the inert tracer gas is helium.

7. The method of claim 6, wherein the pressurized gas is nitrogen.

8. A curing bladder leak detection system for a tire curing press, the tire curing press including at least one tire mold structure with a curing bladder engaging a tire in the tire mold structure, the tire mold structure including passage structure therein, the system comprising:
   a vacuum source constructed and arranged to evacuate, through the passage structure, a space between the curing bladder and the tire,
   a source of inert tracer gas added to an inflation gas, the inflation gas being constructed and arranged to inflate the curing bladder, and
   an electronic sensor constructed and arranged to sense a presence of the inert tracer gas evacuated from the space.

9. The system of claim 8, further comprising a controller electrically connected with the sensor such that when a presence of inert tracer gas is detected, the controller is constructed and arranged to stop operation of a tire curing process being executed by the tire curing press.

10. The system of claim 8, in combination with tire mold structure, the tire mold structure including a top mold platen and a segmented mold operator coupled to the top mold platen, the passage structure being provided through the top mold platen.

11. The system of claim 10, wherein the passage structure is defined by a hollow bolt coupling the segmented mold operator to the top mold platen.

12. The system of claim 8, wherein a pair of tire mold structures is provided, the system further comprising common piping in communication with the passage structure of each tire mold structure, the sensor being in communication with the common piping.

13. A curing bladder leak detection system for a tire curing press, the tire curing press including at least one tire mold structure with a curing bladder engaging a tire in the tire mold structure, the tire mold structure including passage structure therein, the system comprising:
   means for evacuating, through the passage structure, a space between the curing bladder and the tire,
   a source of inert tracer gas added to an inflation gas, the inflation gas being constructed and arranged to maintain inflation of the curing bladder, and
   means for sensing a presence of the inert tracer gas evacuated from the space.

14. The system of claim 13, wherein the means for sensing is a sensor electrically connected with a controller such that when a presence of inert tracer gas is detected, the controller is constructed and arranged to stop operation of a tire curing process being executed by the tire curing press.

15. The system of claim 13, in combination with tire mold structure, the tire mold structure including a top mold platen and a segmented mold operator coupled to the top mold platen, the passage structure being provided through the top mold platen.

16. The system of claim 15, wherein the passage structure is defined by a hollow bolt coupling the segmented mold operator to the top mold platen.

17. The system of claim 13, wherein a pair of tire mold structures is provided, the system further comprising common piping in communication with the passage structure of each tire mold structure, the means for sensing being in communication with the common piping.

18. The system of claim 13, wherein the means for evacuating is vacuum source.

19. The system of claim 13, wherein the inert tracer gas is helium and the inflation gas is nitrogen.

* * * * *